(12) United States Patent
Bertola et al.

(10) Patent No.: US 11,072,202 B2
(45) Date of Patent: Jul. 27, 2021

(54) WHEEL HUB ASSEMBLY PROVIDED WITH AN INNOVATIVE SENSOR HOLDER

(71) Applicant: Aktiebolaget SKF, Gothenburg (SE)

(72) Inventors: Maurizio Bertola, Turin (IT); Dominik Fischer, Schweinfurt (DE); Paolo A Re, Nichelino (IT)

( * ) Notice: Subject to any disclaimer, the term of this patent is extended or adjusted under 35 U.S.C. 154(b) by 218 days.

(21) Appl. No.: 16/372,627

(22) Filed: Apr. 2, 2019

(65) Prior Publication Data

US 2019/0322132 A1   Oct. 24, 2019

(30) Foreign Application Priority Data

Apr. 18, 2018  (IT) .............................. 1020180004657

(51) Int. Cl.
   *B60B 27/00*   (2006.01)
(52) U.S. Cl.
   CPC ................ *B60B 27/0068* (2013.01)
(58) Field of Classification Search
   CPC .... B60B 27/0068; F16C 19/185; F16C 17/24; F16C 2326/02; F16C 2226/76; F16C 33/723
   See application file for complete search history.

(56) References Cited

U.S. PATENT DOCUMENTS

| | | | |
|---|---|---|---|
| 6,924,638 B2* | 8/2005 | Muramatsu | B60B 27/00 324/174 |
| 7,198,407 B2* | 4/2007 | Iiya | B60B 27/00 384/448 |
| 7,320,258 B2* | 1/2008 | Tawara | G01P 3/443 324/174 |
| 7,547,145 B2* | 6/2009 | Yamamoto | F16C 41/007 324/207.25 |
| 8,043,010 B2* | 10/2011 | Kawamura | F16C 41/007 384/448 |
| 8,123,410 B2* | 2/2012 | Masuda | F16C 33/7896 384/448 |

(Continued)

FOREIGN PATENT DOCUMENTS

| CN | 107542753 | 1/2018 |
|---|---|---|
| DE | 102013215621 | 2/2014 |

(Continued)

OTHER PUBLICATIONS

International Search Report for corresponding Italy Patent Application No. 201800004657 dated Jan. 24, 2019.

*Primary Examiner* — Freddie Kirkland, III
(74) *Attorney, Agent, or Firm* — Reed Smith LLP

(57) ABSTRACT

A wheel hub assembly for motor vehicles, having a rotating hub and a bearing unit. The bearing unit including a radially outer ring provided with respective radially outer raceways, a radially inner ring provided with respective radially inner raceways, a plurality of rolling bodies positioned between the corresponding inner and outer raceways, a sensor for detecting the speed of rotation and the associated sensor holder. A cavity is formed in the radially outer ring of the bearing unit and a protuberance is formed on the outer mounting diameter of the sensor holder, the protuberance being able to be inserted inside the cavity to perform an anti-rotation retention function and ensure the mechanical orientation of the sensor holder.

3 Claims, 2 Drawing Sheets

(56) References Cited

U.S. PATENT DOCUMENTS

| | | | | |
|---|---|---|---|---|
| 8,641,287 B2* | 2/2014 | Inoue | ................ | G01P 3/443 |
| | | | | 384/448 |
| 10,781,861 B2* | 9/2020 | Nakamura | ............ | F16C 33/768 |
| 2004/0108849 A1* | 6/2004 | Muramatsu | ............ | F16C 19/187 |
| | | | | 324/174 |
| 2012/0230621 A1* | 9/2012 | Inoue | ................ | F16C 41/007 |
| | | | | 384/448 |
| 2017/0001471 A1* | 1/2017 | Fukuda | ................ | B29C 45/561 |

FOREIGN PATENT DOCUMENTS

| | | |
|---|---|---|
| DE | 102015210692 | 12/2016 |
| JP | 2010180983 | 8/2010 |

\* cited by examiner

WHEEL HUB ASSEMBLY PROVIDED WITH AN INNOVATIVE SENSOR HOLDER

CROSS-REFERENCE

This application claims priority to Italian patent application no. 102018000004657 filed on Apr. 18, 2018, the contents of which are fully incorporated herein by reference.

TECHNOLOGICAL FIELD

The present invention relates to a wheel hub assembly provided with an innovative "sensor holder" having anti-rotation and orientation characteristics. In particular, the sensor may be a device for detecting the speed of rotation, namely a sensor which measures the speed of rotation of a wheel of a motor vehicle and is controlled by the known Antilock Brake System (ABS).

The present invention is suitable in particular, although not exclusively, for the wheel hub assemblies of motor vehicles, the assemblies being provided with a rolling bearing. These applications comprise both the case where the outer ring of the bearing is rotating, while the inner ring of the bearing is fixed, and the opposite case where the inner ring rotates and the outer ring is fixed. The invention is also suitable for any type of rolling body (balls, rollers, tapered rollers, etc.).

BACKGROUND

Devices for detecting the speed of rotation of the rotating ring of the bearing are known and commonly used. These devices comprise a phonic wheel or encoder and a sensor, normally a speed sensor, which is able to acquire a signal generated by the phonic wheel. The device is controlled by the brake control system (ABS) and also allows monitoring of the kinematic operating parameters of the wheel hub assembly with rolling bearing.

Measurement of the speed of rotation of the wheels or the bearing associated with the wheel is fundamental for operation of the ABS. The sensors which are normally used are based on magnetic effects, are positioned outside of the bearings—in most cases inside a hole formed in the suspension—and face the bearing.

In the design of the wheel hub assemblies "sensor holders" which support the sensor on the assembly itself instead of on the suspension are also used. Owing to this design the sensor is situated closer to the encoder in an attempt to improve the reading resolution of the sensor.

There are however a number of drawbacks which are associated with this design solution. A first drawback consists in the rotation of the sensor holder once it has been mounted on the seat of the outer ring of the bearing. A second drawback is associated with the absence of a mechanical orientation reference point to be used during assembly of the sensor holder in the seat on the outer ring of the bearing.

At the present time a reliable solution has not yet been found for these drawbacks. In fact, at present the mechanical orientation of the sensor holder is performed by means of specific and costly instruments along the production line. Moreover, no mechanical anti-rotation feature is provided. The only anti-rotation constraint used at present is the geometric interference play between the sensor holder and the seat on the outer ring of the bearing.

There therefore exists the need to design a wheel hub assembly provided with an innovative sensor holder which is devoid of the aforementioned drawbacks.

SUMMARY

The object of the present invention is to provide a wheel hub assembly provided with an innovative sensor holder having anti-rotation and mechanical orientation characteristics.

This is achieved by means of a cavity which is specifically designed and formed in a specific position on the outer ring of a bearing. The cavity interfaces with a sensor holder and allows precise positioning and ensures an anti-rotation effect for the sensor holder during the assembly operation.

Therefore, this solution prevents rotation of the sensor holder once it has been mounted in the seat on the outer ring of the bearing and allows the creation of a mechanical orientation reference point to be used during assembly of the sensor holder in the seat on the outer ring of the bearing.

Therefore, according to the present invention, a wheel hub assembly provided with an innovative sensor holder having the characteristic features indicated in the attached independent claim is provided.

Further preferred and/or particularly advantageous embodiments of the invention are described in accordance with the characteristic features indicated in the attached dependent claims.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
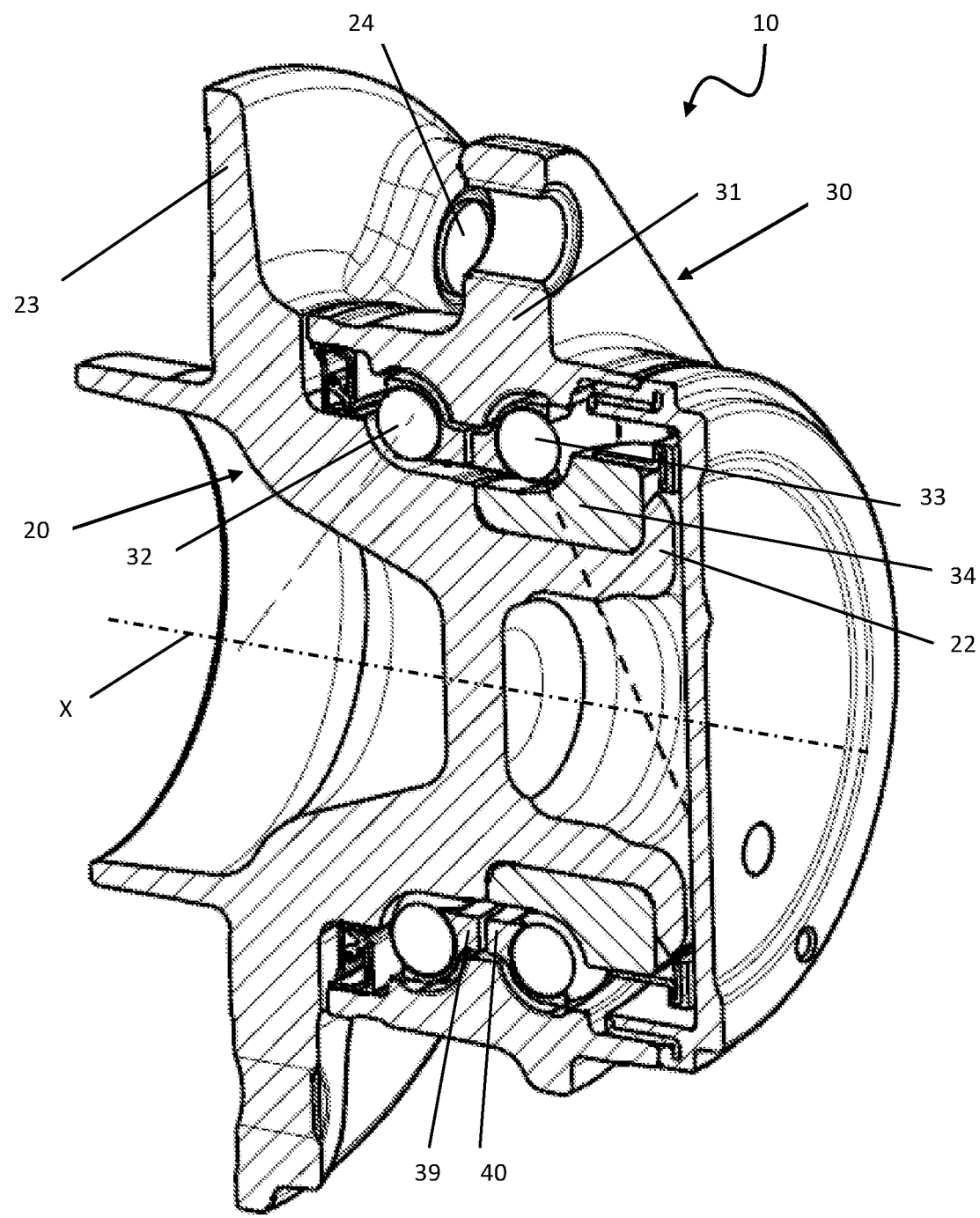
FIG. 1 is a cross-section through an axonometric view of a wheel hub assembly according to an embodiment of the present invention.

With reference now to the aforementioned figures, a wheel hub assembly according to a preferred embodiment of the invention is denoted overall by 10. As mentioned in the preamble, the invention is applicable not only to the configuration described below, but more generally to any wheel hub assembly for motor vehicles.

The group 10 comprises a hub 20 which is preferably, but not necessarily, rotating and a bearing unit 30. The hub 20 is configured to assume also the function of an inner rolling ring of the bearing. In the whole of the present description and the claims, the terms and expressions indicating positions and orientations such as "radial" and "axial" are understood as referring to the central axis of rotation X of the bearing unit 30. Expressions such as "axially outer" and "axially inner" refer instead to the assembled condition and, in the specific case, preferably refer to a wheel side and, respectively, to a side opposite to the wheel side.

The bearing unit 30 comprises a radially outer ring 31 which is preferably, but not necessarily, stationary and provided with respective radially outer raceways, at least one radially inner ring 20, 34 which is rotating and provided with respective radially inner raceways and two rows of rolling bodies 32, 33, in this example balls. The axially outer row of rolling bodies 32 is arranged between the radially outer ring 31 and the hub 20 with the function of a radially inner ring, while the axially inner row of rolling bodies 33 is arranged between the radially outer ring 31 and the radially inner ring 34. For the sake of easier illustration, the reference numbers 32, 33 will be used to identify both the single balls and the row of balls and in particular 32 will indicate the axially outer row of balls or single ball, while 33 will indicate the axially inner row of balls or single ball. Again, for the sake of simplicity, the term "ball" may be used by way of example in the present description and in the attached drawings instead of the more generic term "rolling body" (and likewise the same reference numbers will also be used). It will be understood always that, instead of balls, any other rolling body (for example, rollers, tapered rollers, needle rollers, etc.) may be used.

According to a preferred embodiment of the invention which is not shown, but may be easily deduced from that described above, the radially outer ring 31 could also be a rotating ring, while the radially inner ring could also be a stationary ring.

The rolling bodies of the rows 32, 33 are kept in position by corresponding cages 39, 40.

The hub 20 defines at its axially inner end a rolled edge 22 which is configured to preload axially the inner ring 34. The hub 20 also has an axially outer flange portion 23. The flange portion has a plurality of axial fixing holes 24. These holes are the seats for corresponding fixing means (for example stud bolts, not shown in the figures) which connect in a known manner a part of the motor vehicle wheel, for example the brake disc (also known per se and not shown in the figures) to the hub 20.

Figure 2:
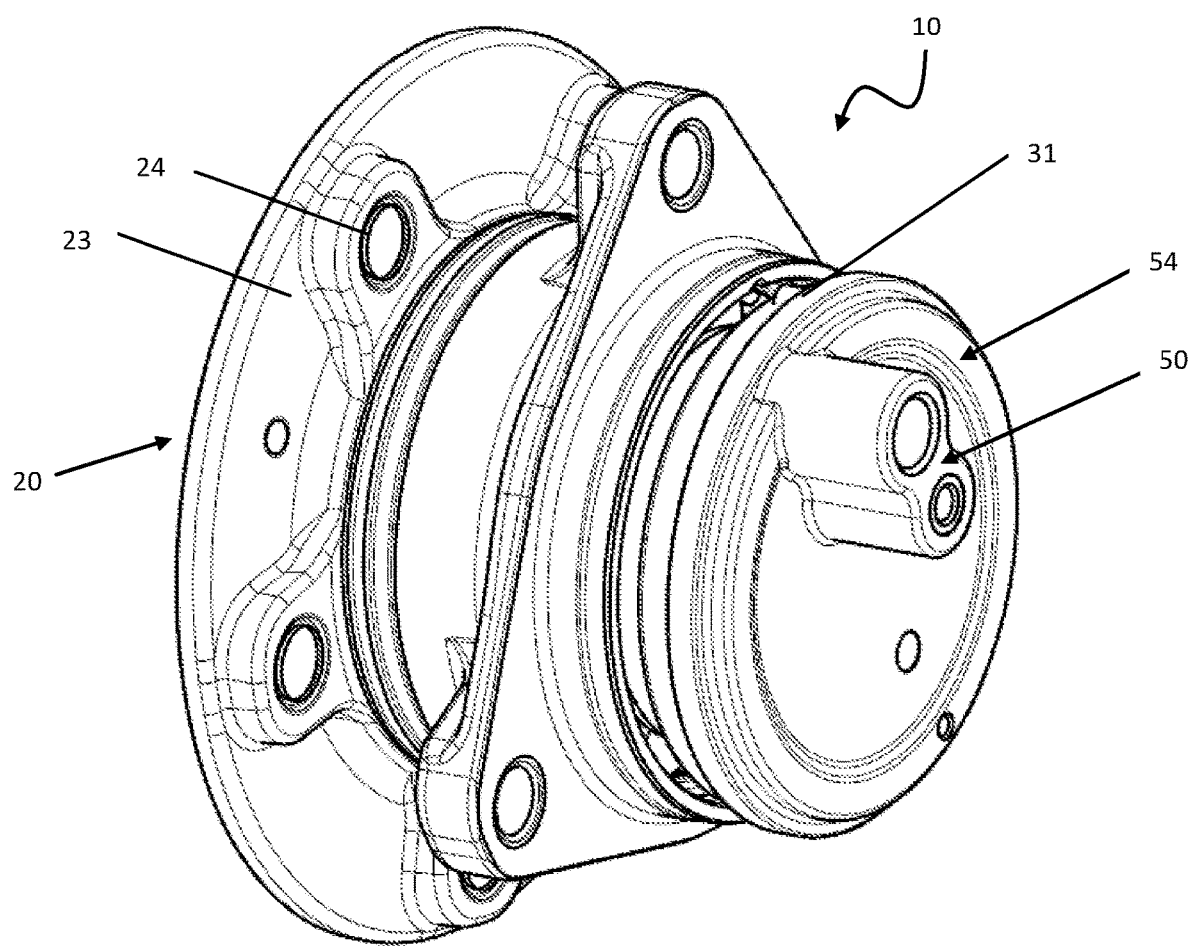
FIG. 2 is an axonometric view of the wheel hub assembly shown in FIG. 1, provided with a sensor holder.

With reference to FIG. 2 the wheel hub assembly 10 is also provided with a sensor 50 and the associated sensor holder 54. In particular, the sensor may be device for detecting the speed of rotation, namely a sensor which measures the speed of rotation of a motor vehicle wheel and is controlled by the known Antilock Brake System (ABS). The sensor holder 54 has anti-rotation and orientation characteristics, as will be explained more clearly below.

Figure 3:
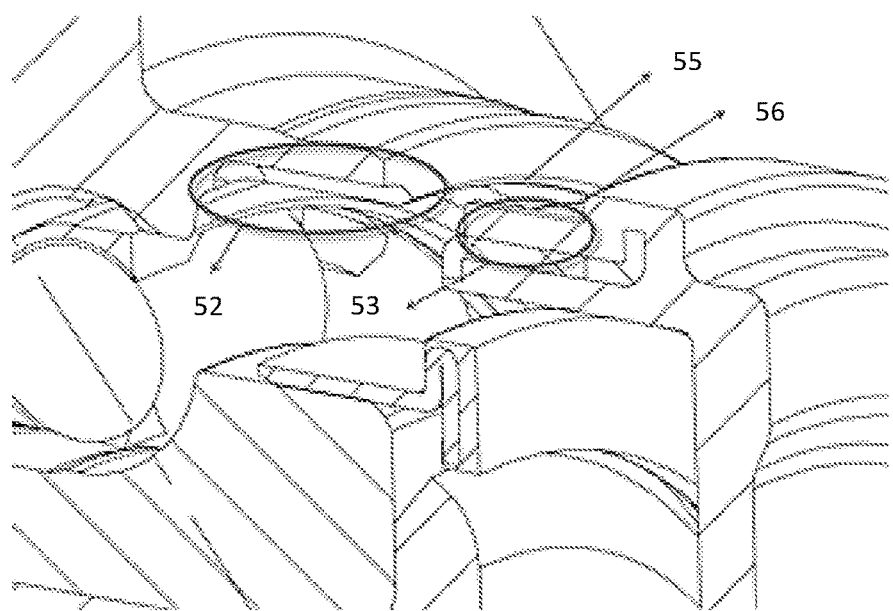
FIG. 3 is an enlarged detail of FIG. 2 in which the anti-rotation and orientation characteristics according to the present invention may be seen.

With reference also to FIG. 3, the solution according to an embodiment of the present invention comprises:

a cavity 52 (or a blind hole) formed by means of a machine tool in the radially outer ring 31 of the bearing unit 30 and more precisely along the diameter of the seat 55 where the sensor holder 54 is mounted;

a protuberance 53 is formed on the sensor holder 54 which is usually made of plastic, along its outer mounting diameter 56; the cross-section of the protuberance 53 is smaller, by an amount ranging from 30 to 50%, than the corresponding cross-section of the cavity 52 formed in the seat of the outer ring.

The protuberance 53 on the sensor holder 54 is designed so as to ensure a specific angular position related to the final position of the sensor holder with respect to the radially outer ring of the bearing.

Obviously, during mounting of the sensor holder, it is possible to use the protuberance 53 of the holder to ensure the mechanical orientation of the sensor holder 54.

Once assembled, the protuberance 53 of the sensor holder 54 will be located inside the cavity 52 of the radially outer ring 31. In this way an anti-rotation retention function which is stronger and more efficient than the geometric interference play between the sensor holder and the seat on the outer ring of the bearing, as per the prior art, is provided.

The subject of the present invention, therefore, solves the problems of the prior art and in particular prevents rotation of the sensor holder, once it is mounted in the seat on the outer ring of the bearing, and allows the creation of a mechanical orientation reference point to be used during assembly of the sensor holder in the seat on the outer ring of the bearing.

In addition to the embodiments of the invention, as described above, it is to be understood that numerous further variants are possible. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A wheel hub bearing configured for a wheel of a motor vehicle, comprising:
    a rotatable hub, and
    a bearing unit having:
    a radially outer ring provided with respective radially outer raceways,
    a radially inner ring having respective radially inner raceways,
    a plurality of rolling bodies positioned respectively between the inner and the outer raceways,
    a sensor holder provided on the rotatable hub, the sensor holder having an annular external mounting diameter,
    a sensor configured for detecting the speed of rotation of the wheel, wherein the sensor is held by the sensor holder,
    a seat provided in the radially outer ring and configured to have an annular diameter onto which the annular external mounting diameter of the sensor holder is mounted,
    a cavity formed as an axially oriented blind hole at a mechanical orientation reference point on the seat of the radially outer ring of the bearing unit, and
    a protuberance provided on the sensor holder and configured to fit inside the cavity to provide an anti-rotation retention function and configured to provide mechanical orientation of the sensor holder.

2. The wheel hub assembly according to claim 1, wherein the cross section of the protuberance is less than 50% of the cavity cross section.

3. The wheel hub assembly according to claim 1, wherein the sensor holder is made of plastic material.

* * * * *